United States Patent [19]
Galione

[11] 4,094,484
[45] June 13, 1978

[54] BALANCED PORTABLE PEDESTALS

[75] Inventor: Edward Richard David Galione, Bury St. Edmunds, England

[73] Assignee: W. Vinten Limited, Bury St. Edmunds, England

[21] Appl. No.: 772,422

[22] Filed: Feb. 28, 1977

[30] Foreign Application Priority Data

Mar. 13, 1976 United Kingdom ............... 10168/76

[51] Int. Cl.² .............................................. A47F 5/12
[52] U.S. Cl. .................................... 248/162; 248/171
[58] Field of Search ............... 248/400, 162, 123, 410, 248/399, 158, 161, 404, 412, 170, 171; 108/144, 147, 148; 267/124

[56] References Cited

U.S. PATENT DOCUMENTS

| 669,480 | 3/1901 | Havell | 248/171 |
|---|---|---|---|
| 3,193,239 | 7/1965 | Monroe | 248/400 |
| 3,201,079 | 8/1965 | Doetsch | 248/400 X |
| 3,682,424 | 8/1972 | Strumpell | 248/162 |
| 3,762,269 | 10/1973 | Rusbach | 248/170 X |
| 3,828,694 | 8/1974 | Nestler | 248/400 X |
| 3,966,182 | 6/1976 | Stadelmann et al. | 248/400 X |
| 3,989,211 | 11/1976 | Gundlach | 248/162 |
| 4,037,811 | 7/1977 | O'Connor | 248/162 |

*Primary Examiner*—J. Franklin Foss
*Attorney, Agent, or Firm*—Larson, Taylor and Hinds

[57] ABSTRACT

Instrument support pedestal having self pumping action providing pedestal pressurization for substantially counterbalancing instrument weight. The pedestal also having column alignable fold-up support legs adjustable for setting the verticallity of the column and compactness for transportation.

8 Claims, 2 Drawing Figures

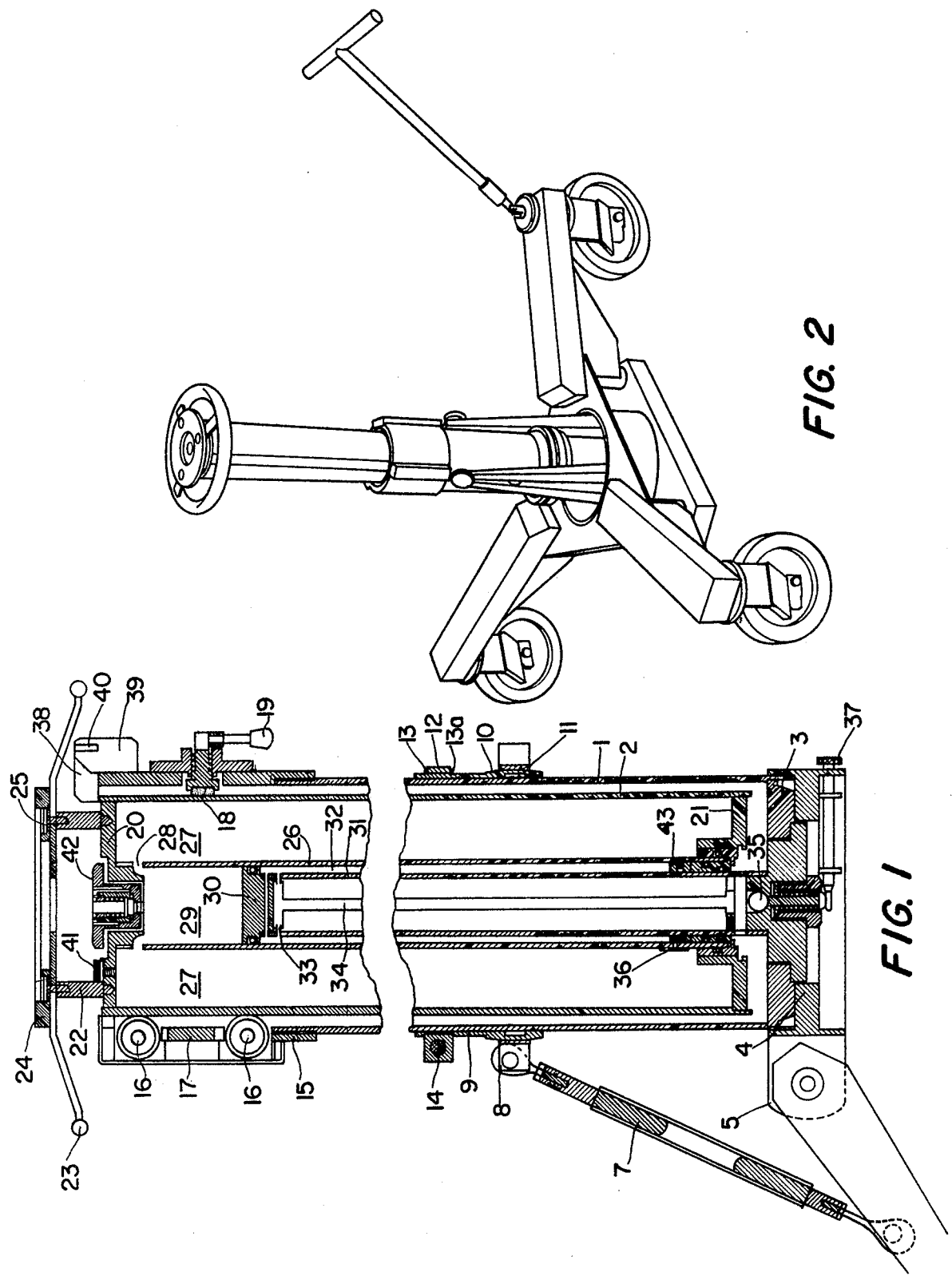

BALANCED PORTABLE PEDESTALS

This invention relates to balanced pedestals such as are commonly used for supporting television cameras, or the like, but more particularly, though not exclusively, to balanced pedestals which are fully portable and may easily be reduced in their physical dimensions for hand transportation.

Portable pedestals are known, such as described in G.B. Pat. Nos. 1,260,368 and 1,377,897, which deal mainly with adjustable legs and/or adjustable supporting columns. Pedestals with a degree of balancing are also known wherein a hand pump is provided for pressurisation, or a charging bottle has to be transported to the location in addition to the pedestal. In the case of pressurisation by hand pump the pedestal operates on a similar principle to a hydraulic jack i.e. pressure is increased via the hand pump to gain height and pressure is released to lower the pedestal, and in the case of a charging bottle or sometimes a compressor, the pedestal, when charged, or pressurised, becomes a balanced pedestal, but its operation is limited due to the problems of charging.

It is therefore an object of this invention to overcome these deficiencies and to provide a balanced portable pedestal, requiring no special external charging equipment; and which is fully transportable, to virtually any location, in an uncharged or charged state.

It is also an object of this invention to provide a balanced portable pedestal wherein the pedestal is pivotally mounted in a slidable gimbal ring to which supporting legs may be attached so that the balanced section of the pedestal may be adjustable in verticality and said legs may be pivotally rotated into close proximity to the balanced section for transportation.

According to the invention we provide a portable pedestal for instruments such as cameras or the like, comprising a base member having an outer column mounted thereon, at least one inner column slidably locatable substantially concentric with said outer column, pressure increasing means operable to pressurise said inner column via valve means during relative movement between said inner and outer columns to produce a pressure of gas within said inner column operable to substantially balance said inner column against an externally applied force on said inner column.

According to another aspect of the invention we provide a portable pedestal for instruments such as cameras or the like, comprising a column, at least three legs pivoted at the lower end of said column for swinging movement between a first position adjacent the column and a second position extending at an angle from the column to define a base for supporting said column, at least one strut pivotally located between each of said legs and a clamping ring slidably locatable on said column so that said legs may be adjustably moveable between said first and second positions.

According to a further aspect of the invention we provide a portable pedestal for instruments such as cameras or the like, comprising a column, at least three legs pivoted at the lower end of said column for swinging movement between a first position adjacent the column and a second position extending at an angle from the column to define a base for supporting said column, at least one strut pivotally located between each of said legs and a moveably positionable ring with clamping means gimbally located over an annulus having attached thereto a clamping ring slidably locatable on said column so that said legs may be adjustably moveable between said first and second positions and said column may be adjusted in verticality relative to said legs.

According to a still further aspect of the invention we provide a portable pedestal for instruments such as cameras or the like, comprising an outer column, at least three legs pivoted at the lower end of said column for swinging movement between a first position adjacent the column and a second position extending at an angle from the column to define a base for supporting said column, at least one strut pivotally located between each of said legs and a clamping ring slidably locatable on said outer column so that said legs may be adjustably moveable between said first and second positions, at least one inner column slidably located substantially concentric with said outer column having a cylinder therein, a double acting piston within said cylinder operably secured to a base plate on said outer column to pressurise said inner column via valve means during relative movement between said inner and outer columns to produce a pressure of gas within said inner column operable on said piston and related to an applied force on said inner column.

According to yet another aspect of the invention we provide a portable pedestal for instruments such as cameras or the like, comprising an outer column, at least three legs pivoted at the lower end of said column for swinging movement between a first position adjacent the column and a second position extending at an angle from the column, at least one strut pivotally located between each of said legs and a moveably positionable ring with clamping means gimbally located over an annulus having attached thereto a clamping ring slidably located on said outer column so that said legs may be adjustably moveable between said first and second positions and said outer column may be adjusted in verticality relative to said legs, at least one inner column slidably locatable substantially concentric with said outer column having a cylinder therein, a double acting piston within said cylinder operably secured to a base on said outer column to pressurise said inner column via valve means during relative movement between said inner and outer columns to produce a pressure of gas within said inner column operable on said piston and related to an applied force on said inner column.

The invention will now be described by way of example only, in conjunction with the accompanying drawings in which:

FIG. 1 shows a cross section of a pedestal, incorporating the various aspects of the invention, and FIG. 2 shows the pedestal of the invention mounted on a skid.

Though shown in FIG. 1, and now described as a complete unit, the individual advantages of the various aspects comprising the whole may equally well be taken separately as shown in the aforegone statements.

Referring now to FIG. 1, a column 1 which may be a solid or hollow rod, if only the adjustable legs are to be used, or as shown in the figure if used to act as a guide and container or outer column, for an inner column 2. Suitably attached at the base of column 1 is an end plug 3 to which may be suitably secured a base 4 having three pairs of lugs 5 suitably attached, or manufactured therewith, equally spaced about the periphery for pivotal reception of the column end of three legs 6, only a part of one shown, and which may be of any desirable shape and may terminate in such as castors, rollers, suction pads or any other such known means. A leg stay 7 which may be of the turnbuckle type is pivotally located at one end at a suitable distance along a leg 6. A further set of three pairs of lugs 8 equally spaced about the periphery of a sliding member 9, slidable longitudinally along column 1 serve as pivotal securing points for the other end of each of the three leg stays 7. Preferrably the sliding member, or annulus 9, comprises three parts, a tubular section slidably located over column 1, having a raised spherical portion 10 upon which a mating spherical annulus 11 may be located to form a gimbaled mount for the further set of three pairs of lugs. It is also preferrable that the spherical annulus 11 may be lockable on the raised spherical portion 10. A clamp ring 12 encircling the sliding member 9 and longitudinally retained in position by lugs 13, 13a is operable to rigidly retain the sliding member 9 in any desired location on the column 1 by operation of a threaded clamp bolt 14 which may for convenience have a knurled knob.

Located at the upper end of column 1 is a runner bracket tube 15 having three sets of guide runners 16, only one shown, spaced equidistant about the circumference of the tube 15. Preferrably each set of guide runners comprise four ballraces located in pairs on a runner bracket 17 suitably attached to the runner bracket tube 15 so that the three sets of four ballraces act as locating guides for the inner column 2 so that the inner column may be slidably located longitudinally within the outer column and may be locked in any required degree of extension by a brake pad 18 operable by a brake handle 19. Preferrably the inner column has an end plug 20 at its upper end and an end plug 21 at its lower end. Located on top of the end plug 20, preferrably on a plurality of stand-offs, or pillars 22, is a control ring 23 and a suitable mount 24 for securement of an instrument. These may be secured to the stand-offs by such means as screws 25.

A cylinder 26 located within the inner column 2 forms a pressurisable chamber 27 in communication via apertures 28 with a variable volume cavity 29 at the upper end of cylinder 26. The volume of the cavity 29 is variable by the action of a piston 30 located within the cylinder 26 and suitably attached by piston rod 31 to the base 4 of the outer column 1. Preferrably the means of attachment between piston 30 and base 4 should form a small capacity chamber 32 between the inner wall of the cylinder 26 and the outer wall or periphery of the attachment means 31. The small capacity chamber 32 is in communication with atmosphere via apertures 33, tube 34, and ballvalve 35, and in communication with chamber 27 via a flap valve 36. A pin actuator 37 slidably located to open the ballvalve 35 when chamber 27 and cavity 29 are sufficiently pressurised ensures that no further pressurisation takes place during normal operation of the pedestal.

In operation with pin actuator 37 permitting the ballvalve 35 to seat and, with the brake pad 18 released, extension of the inner column 2 from within the outer column 1 expels all gas (air) from the small capacity chamber 32 via the flap valve 36 into the chamber 27. Compression of the inner column 2 within the outer column 1 now causes a partial vacuum to form in the small capacity chamber, sealing off the flap valve 36 and lifting the ballvalve 35 from its seat allowing air at atmospheric pressure to enter the small capacity chamber 32 via the ballvalve, tube 34 and aperture 33. As the pressure within the small capacity chamber 32 tends towards atmospheric the ballvalve 35 reseats and the operation as previously described is repeated, pressurising chamber 27 and cavity 29. As the pressure increases the pumping action becomes partially self assisting. When the pressure within the cavity 29 is sufficient to balance a force applied on the instrument mount 24, at approximately half piston stroke, the pin actuator 37 is operated to lift the ballvalve so that no further pumping action takes place on relative movement between the inner and outer columns. A minimal pressure is now required to raise or lower the inner column within the outer column and when the desired height is selected operation of the brake handle 19 applies the brake pad 18 to retain the relative positions of the two columns.

For local transportation with the pedestal pressurised a latch 38 pivotally located in a latch bracket 39 and maintained in its operative position by a latch lock 40 retains the inner column within the outer column. Preferrably the latch lock should not be inadvertently releaseable.

For more general transportation and for releasing the pressure within the chamber 27 so that the pedestal may be transported over a considerable distance, in complete safety and depressurised state, a pressure release screw 41 is provided.

A relief valve housing 42, containing a pre-settable relief valve of well known type, is preferably fitted in the end plug 20 of the inner column so that a pre-determined pressure may not be exceeded.

To avoid metal to metal buffeting as the inner and outer columns reach their extremities of movement a buffer 43, such as two nylon rings with an 'O' ring sandwiched therebetween, is suitably located as shown in the diagram, and the external circumference of the rings provides for sufficient clearance to allow air through to the flap valve.

Where necessary pressure proofing is obtained with sealing means such as 'O' ring seals.

It will be obvious to those skilled in the art that various alterations and additions may be made to the apparatus as described without deviating from the invention, for example, the column without legs may be mounted on such as a skid or the column and legs combined may be mounted on such as a skid, as shown in FIG. 2 and in the latter case, the legs may equally well be used for locking the column to the skid.

I claim as my invention:

1. A portable pedestal for instruments such as cameras or the like, comprising a base member having an outer column mounted thereon, at least one inner column slidably locatable substantially concentric with said outer column, pressure increasing means operable to pressurise said inner column via valve means during relative movement between said inner and outer columns to produce a pressure of gas within said inner column operable to substantially balance said inner column against an externally applied force on said inner column.

2. A portable pedestal as claimed in claim 1 wherein said pressure increasing means comprises a cylinder within said inner column and attached thereto, a double acting piston within said cylinder operably secured to a base plate on said outer column, and one or more interconnecting passages between said cylinder and said inner column.

3. A portable pedestal as claimed in claim 1 wherein said valve means comprises two or more non return valves.

4. A portable pedestal as claimed in claim 3 wherein at least one of said non return valves may be rendered inoperative.

5. A portable pedestal as claimed in claim 1 wherein a pressure relief valve is fitted and set to operate at a pre-determined maximum pressure.

6. A portable pedestal as claimed in claim 1 wherein a pressure bleed means is fitted and is operable to release pressure within the inner column to depressurise the pedestal for transportation of said pedestal.

7. A portable pedestal for instruments such as cameras or the like comprising, a column, at least three legs pivoted at the lower end of said column for swinging movement between a first position adjacent the column and a second position extending at an angle from the column to define a base for supporting said column, at least one strut pivotally located between each of said legs and a moveably positionable ring with clamping means gimbally located over an annulus having attached thereto a clamping ring slidably locatable on said column so that said legs may be adjustably moveable between said first and second positions and wherein as least one said strut is pivotally located on said moveably positionable ring for adjustment of said column in verticality relative to said legs.

8. A portable pedestal as claimed in claim 1 used in conjunction with a portable skid.

* * * * *